United States Patent [19]
Warchol et al.

[11] Patent Number: 5,652,837
[45] Date of Patent: Jul. 29, 1997

[54] MECHANISM FOR SCREENING COMMANDS ISSUED OVER A COMMUNICATIONS BUS FOR SELECTIVE EXECUTION BY A PROCESSOR

[75] Inventors: Nicholas Allen Warchol, Boxborough; Chester Pawlowski, Westford, both of Mass.

[73] Assignee: Digital Equipment Corporation, Maynard, Mass.

[21] Appl. No.: 543,228

[22] Filed: Oct. 13, 1995

Related U.S. Application Data

[63] Continuation of Ser. No. 329,048, Oct. 25, 1994, abandoned, which is a continuation of Ser. No. 34,017, Mar. 22, 1993, abandoned.

[51] Int. Cl.[6] .................................................. G06F 13/20
[52] U.S. Cl. ...................... 395/186; 395/200.06; 395/728
[58] Field of Search .......................... 395/200.06, 868, 395/284, 186, 187.01, 188.01, 728, 732, 183.15, 184.01; 380/3, 4, 25

[56] References Cited

U.S. PATENT DOCUMENTS

| | | | |
|---|---|---|---|
| 3,920,976 | 11/1975 | Christensen | 371/40.1 |
| 4,686,526 | 8/1987 | Gritzo | 340/825.06 |
| 4,779,195 | 10/1988 | James | 395/869 |
| 5,018,096 | 5/1991 | Aoyama | 395/491 |
| 5,073,933 | 12/1991 | Rosenthal | 380/25 |
| 5,146,565 | 9/1992 | Blanck et al. | 395/856 |
| 5,202,997 | 4/1993 | Arato | 395/186 |
| 5,269,006 | 12/1993 | Dohse et al. | 395/293 |
| 5,287,519 | 2/1994 | Dayan et al. | 395/188.01 |
| 5,349,667 | 9/1994 | Kaneko | 395/740 |
| 5,377,269 | 12/1994 | Heptig et al. | 380/25 |
| 5,412,717 | 5/1995 | Fischer | 380/4 |

*Primary Examiner*—Parshotam S. Lall
*Assistant Examiner*—Viet Vu
*Attorney, Agent, or Firm*—Ronald C. Hudgens; Cathy L. Peterson

[57] ABSTRACT

The invention provides a new process and apparatus for generating and selectively processing command requests issued over a bus. Command requests are generated by devices, each of which may be authorized or not authorized to cause the execution of the requested command. A unique identifier is provided for each device. The command requests are received and the identity of the device which issued the command request is determined. The command is then executed only if the unique identifier associated with the requesting device indicates that the device is authorized to cause the execution of the requested command.

7 Claims, 3 Drawing Sheets

MECHANISM FOR SCREENING COMMANDS ISSUED OVER A COMMUNICATIONS BUS FOR SELECTIVE EXECUTION BY A PROCESSOR

This application is a continuation of application Ser. No. 08/329,048, filed Oct. 25, 1994, now abandoned which is a continuation of application Ser. No. 08/034,017, filed Mar. 22, 1993, now abandoned.

FIELD OF THE INVENTION

The present invention relates to a mechanism for allowing a computing device to discriminate among command requests issued by different devices over a bus.

BACKGROUND OF THE INVENTION

A common requirement in the operation of general purpose computers is the need to stop the operating system. This is typically done so that new software may be loaded or so that operating parameters may be changed. The operating system is also stopped when the computer is to be rebooted or to clear an error condition. An error condition may be caused by a hardware fault, an error in the software, hardware or software incompatibilities in the computer system, or the like. Once such an error condition has occurred, the computer may be wholly unresponsive or may operate improperly due to the corruption of data in volatile memory.

Situations in which the operating system is stopped generally fall into two categories: halting the computer and resetting the computer. Halting the computer stops the operating system and saves the current operating state of the computer. The operating system can then be resumed where it left off by restoring the saved operating state. Resetting the computer also stops the operating system, but does not save the state information required to allow the operating system to resume operation. Instead, a reboot procedure must be used to restart the operating system.

Once it is halted, the operating system does not interpret instructions, initiate input/output operations, or service interrupts or exceptions. However, a console program is generally available to restart the halted operating system at the point where the halt command was encountered, or to reboot the computer with a bootstrap process. The console program may also perform diagnostic functions, such as examining the contents of registers, determining the state of the computer and the cause of any problems encountered, and depositing new values in registers.

Computers may be halted or reset from a variety of sources, including a front panel switch, sensors, and components of the computer system such as input/output devices. The sensors may detect the interruption of power, the shutdown of fans, excessive temperature, or the like. Halts and resets may also be initiated by input/output devices, which are connected to the computer by a bus.

A halt request is typically detected by sensing a single halt line. This halt line, which is often tied to a pin on the central processing unit of the computer, typically halts the operation of the computer when the halt line is held within a specified voltage range. This is often implemented with a wired-OR, with each potential source of a halt request connected to the halt line. When any one or more of these sensors or devices requires the that the computer be halted, the sensor or device asserts the specified voltage on the halt line, halting the computer operation. However, because each sensor or device has the same effect on the halt line, the computer is unable to determine which sensor or device generated the halt signal. Reset requests may be similarly handled.

Because the halt line, or reset line, provides no information regarding the source of any halt or reset request, the operation of the computer is halted without regard to which sensor or device initiated the request. It is often desirable, however, to allow some devices or sensors to halt or reset the computer operation while preventing others from doing so. For example, it is useful to enable a person using a computer over a secure network coupled through one input/output device to halt or reset the computer, while disallowing such requests received from a non-secure network coupled through another input/output device. Further, the number and identity of the particular devices which are allowed to halt or reset the operation of the computer may change during the operation of the computer.

In light of the foregoing, it is desirable to have an intelligent mechanism allowing devices connected to a computer by a bus to selectively cause the execution of commands, such as halting or resetting the operation of the computer. In particular, it is desirable that the mechanism be capable of identifying which device issued the command request. It is further desirable that this mechanism be capable of discriminating among the devices connected to the computer, authorizing some devices to cause the execution of certain commands and prohibiting others from doing so. It is also desirable that, during operation of the computer, the mechanism readily allow the authorization status of each device to change.

SUMMARY OF THE INVENTION

In a broad aspect, the invention relates to an apparatus for selectively causing the execution of a command issued by one or more devices over a bus. An input/output module receives the command and signals the receipt. Means for screening the command then determines the identity of the issuing device, and causes the execution of the command if the issuing device is authorized to cause the execution of the command.

A further aspect of the invention relates to a process for selectively executing commands issued by devices over a bus. The devices are provided with a unique identifier and designated as being either authorized or not authorized to cause the execution of each type of command requested. The devices issue command requests and the identity of the issuing device is determined. The command is executed if the identifier of the issuing device indicates that the device is authorized to cause the execution of the requested command.

In a narrower aspect, the invention relates to a computer system having devices which generate halt requests over a Futurebus+. An input/output module receives the halt requests and means for processing the command request identifies which input/output device generated each request received. The operation of the operating system of the computer is halted in response to a halt request if the identified requesting input/output device is authorized to halt the operation of the operating system.

DETAILED DESCRIPTION OF THE PREFERRED EMBODIMENT

Figure 1:
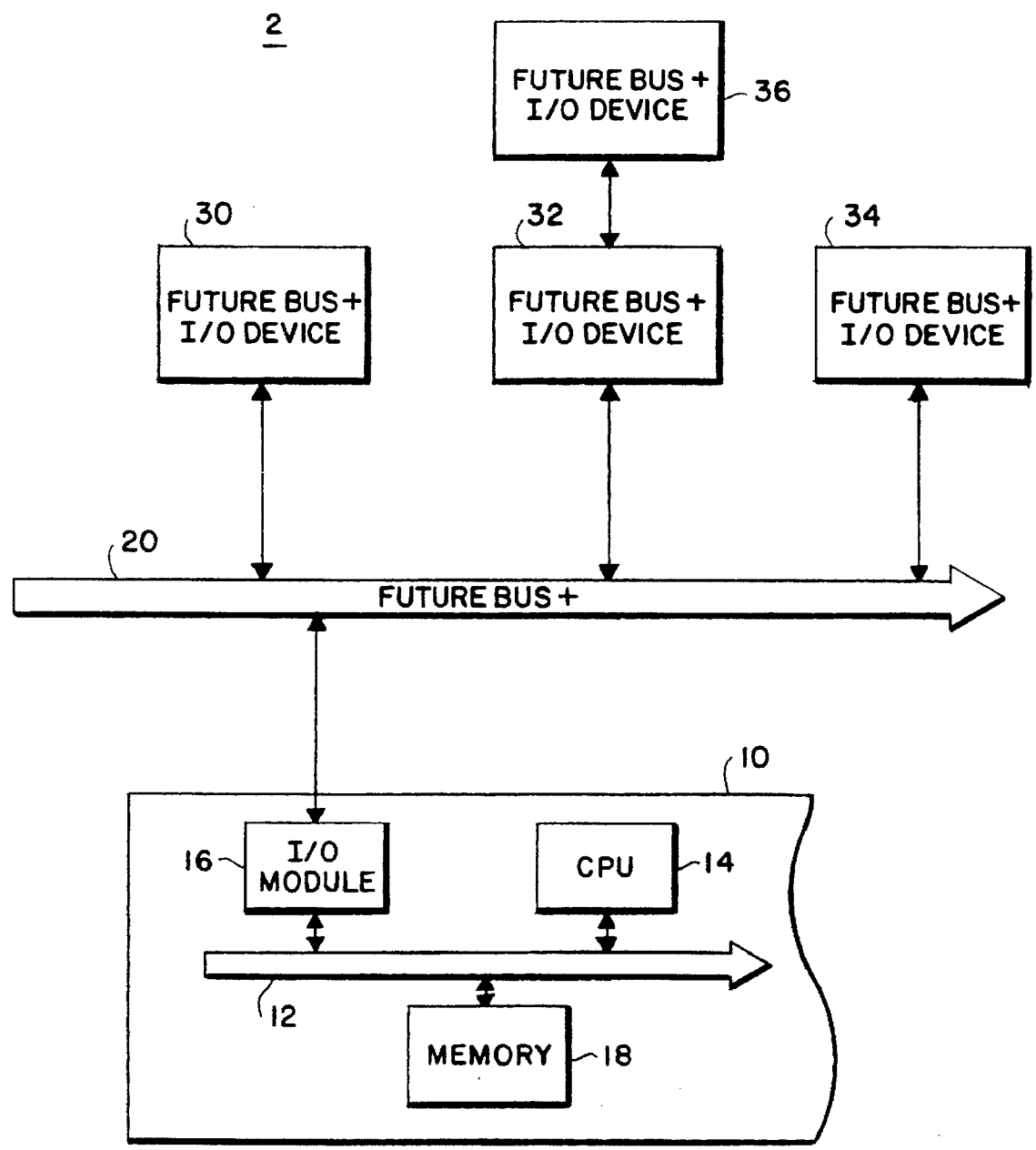
FIG. 1 is a block diagram showing a computer system having a computer and associated input/output devices according to the principles of the invention.

The disclosed invention relates to a mechanism for allowing input/output devices to issue commands, such as halt commands, to a computing device over a bus. One example of such a bus is the Futurebus+, which is described in the Institute of Electrical and Electronics Engineers (IEEE) Standards 896.1-1991 and 896.2-1991, referred to herein as IEEE Standard 896. FIG. 1 shows a computer system 2 having the basic elements of an embodiment according to the principles of the invention. This embodiment includes a computer 10, a bus 20, and input/output devices 30, 32, and 34. The computer 10 includes a computer bus 12 which allows communication among a central processing unit 14, an input/output module 16, and other components, such as a main memory module 18.

In FIG. 1, the bus is a Futurebus+ bus 20, and the input/output devices are Futurebus+ input/output devices 30, 32, and 34. As shown, the Futurebus+ bus 20 is coupled to the computer 10 via the computer's input/output module 16. The Futurebus+ bus 20 is also coupled to Futurebus+ input/output devices 30, 32, and 34. These devices 30, 32, and 34 may be FDDI or Ethernet adapters, asyncronous communications devices, or the like. The external devices, designated by reference number 36 in FIG. 1, may represent computer terminals, communication devices, remote computer nodes coupled to a computer network, or other devices.

The disclosed invention may be used to process command requests from any number of input/output devices, and is not limited to operation with the three Futurebus+ input/output devices shown in FIG. 1. However, the advantages of the invention are most effectively exploited by a computer system 2 which includes either two or more Futurebus+ input/output devices, or a single Futurebus+ input/output device having multiple ports.

Figure 2:
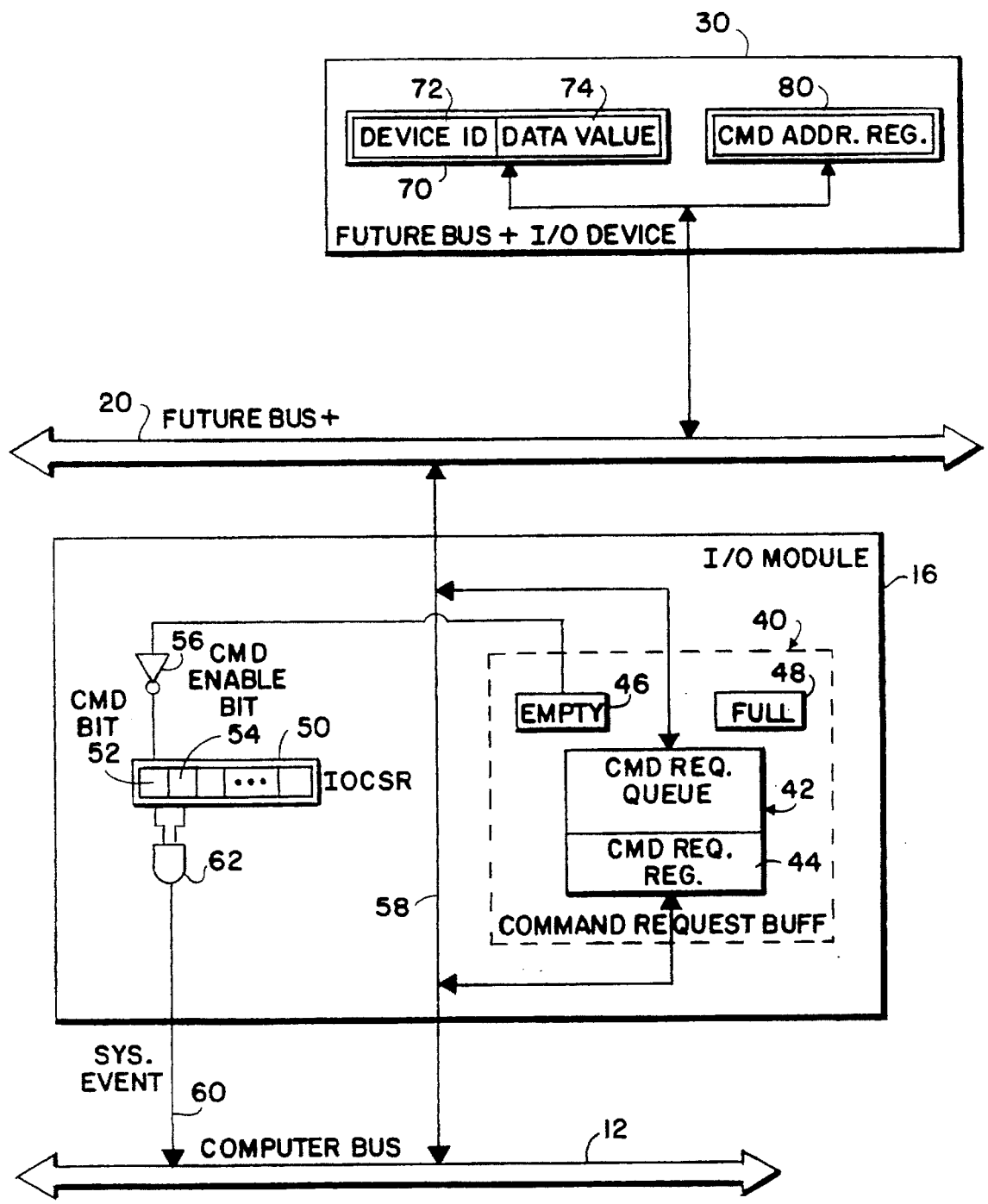
FIG. 2 is a block diagram showing the input/output module and a selected input/output device of FIG. 1 in more detail.

FIG. 2 is a subset of the block diagram of FIG. 1 showing the input/output module 16 and a selected Futurebus+ input/output device 30 in greater detail. As shown in the embodiment of FIG. 2, the input/output module 16 includes a command request buffer 40. The command request buffer 40 has a command request queue 42 which, in turn, has a command request register 44. The command request register 44 represents the "head" of the queue 42 where data is read from the command request queue 42. Data written into the command request queue 42 is written to the "tail" of the queue.

The command request queue 42 may be any given depth. Where the command request queue 42 has a depth of one, it is composed solely of the single command request register 44. In such a case, the command request register 44 represents both the head and the tail of the command request queue 42. However, where the command request queue 42 has a depth of greater than one, the command request register 44 represents only the head of the queue, which is the hardware location in the command request queue 42 which contains the data word which is to be read next. Implementations of the command request queue 42 with a depth of greater than one, such as a first-in-first-out (FIFO) queue, allow the input/output module 16 to buffer multiple command requests received from one or more Futurebus+ input/output devices 30, 32, or 34. Such an implementation prevents the loss of command requests during periods when an ineffective command request is stored and pending in the command request register 44. A command request may be ineffective due to it having been issued by a Futurebus+ input/output device 30 not authorized to cause the execution of the requested command. The command request queue 42 of FIG. 2 has a depth of greater than one.

The command request buffer 40 also includes two specialized single-bit status outputs, a queue-empty output 46, and a queue-full output 48. The queue-empty output 46 signals that the command request queue 42 is empty, indicating that the command request register 44 does not currently contain a command request. The queue-full output 48 indicates that the command request queue 42 cannot store any more command requests until the next read operation is performed on the command request queue 42. The queue-empty and queue-full outputs 46 and 48 may be implemented with software or with hard-wired logic. In the preferred embodiment of FIG. 2, they are hard-wired.

The input/output module 16 also includes an input/output control status register (IOCSR) 50. The IOCSR 50 includes two specialized bits, a command bit 52 and a command enable bit 54. The state of the command bit 52 signals whether there is a pending command request in the command request register 44. In the embodiment shown, the command bit 52 is derived, via an inverter 56, from the queue-empty output 46 of the command request buffer 40. Thus, whenever the command request queue 42 is not empty, the command bit 52 is asserted. In an alternative embodiment, the command bit 52 may be asserted by software.

The second specialized bit in the IOCSR 50, the command enable bit 54, controls whether command requests in the command request register 44 will be considered for execution. In the embodiment of FIG. 2, the state of the command enable bit 54 is controlled by the central processing unit 14, and the execution of command requests made by Futurebus+ input/output devices 30, 32, and 34 is enabled when the command enable bit 54 is asserted. Conversely, when the command enable bit 54 is deasserted, the execution of command requests is disabled.

In the embodiment of FIG. 2, the command bit 52 and the command enable bit 54 combine to generate a SYS_EVENT interrupt. The SYS_EVENT interrupt signal is generated on a SYS_EVENT line 60 when both of the bits 52 and 54 are asserted, as shown by the logical AND gate 62. The SYS_EVENT interrupt signal may be generated by either an edge or a level detection on the SYS_EVENT line 60. The SYS_EVENT interrupt is level-sensitive in the embodiment of FIG. 2. Once the SYS_EVENT interrupt is generated, an interrupt service routine is executed to process the command request stored in the command request register 44. The interrupt service routine may be executed by the central processing unit 14 of the computer 10, or by a console or other device which may be coupled to the computer bus 12 and have a hardware processor other than the central processing unit 14. The console may be embodied as software executed by the central processing unit 14, or by a process running on a separate processor coupled to the computer bus 12. In the embodiment of FIG. 2, the central processing unit 14 of the computer 10 executes the interrupt service routine as a non-maskable interrupt. The interrupt service routine may be stored in memory, as console firmware, as programing abstract language (PAL) code, or the like.

Instead of generating an interrupt, the command bit 52 and the command enable bit 54 may be polled to determine the presence of a command request in the command request register 44. Similarly, a bit representing a logical AND of the command and command enable bits 52 and 54 may be polled. When polling of the bits reveals that the command and command enable bits 52 and 54 are each asserted, a command request is present. Because an immediate interrupt detects the presence of command requests more quickly than polling does, interrupt signaling is preferred for embodiments for processing halt, reset, reboot, and other commands which may require immediate execution. In addition, polling may be ineffective if the processor which executes the polling routine is "hung" or otherwise inoperable.

The input/output module 16 includes a data link 58 which couples the input/output module 16 with both the computer bus 12 and the Futurebus+ bus 20. This data link 58 serves as the conduit for the transmission of data and address information between the computer 10 and the Futurebus+ bus 20. In the embodiment shown in FIG. 2, the data link 58 is 64 bits wide, to match the width of the Futurebus+ bus 20. The command request register 44 is 16 bits wide.

Consistent with the principles of the invention, the command bit 52 and the command enable bit 54 may be embodied in software or in other hardware configurations. For example, the SYS_EVENT line 60 may be derived directly from an inverted queue-empty output 46 of the command request buffer 40. In such an implementation, the interrupt service routine triggered by the SYS_EVENT interrupt determines whether or not to proceed with the processing of any command requests, performing a function analogous to that of the command enable bit 54 of FIG. 2.

The Futurebus+ input/output device 30 of FIG. 2 includes two registers, both of which are coupled to the Futurebus+ bus 20. The first of these two registers is the command vector register 70, which contains fields for a device identifier 72 and for a data value 74. The second register in the Futurebus+ input/output device 30 is the command address register 80. Both of these registers 70 and 80 are coupled to the Futurebus+ bus 20, allowing the transmission and receipt of information. In the embodiment of FIG. 2, the command address register is 32 bits wide, and the command vector register 70 is 16 bits wide. Within the command vector register 70, the fields for the device identifier 72 and the data value 74 are 3 and 13 bits wide respectively. However, these bit widths are given for example only. For example, the device identifier 72 may be expanded to accommodate a greater number of Futurebus+ input/output devices or ports. The purpose and operation of the device identifier 72, the data value 74, and the command address register 80 are described more fully below.

Figure 3:
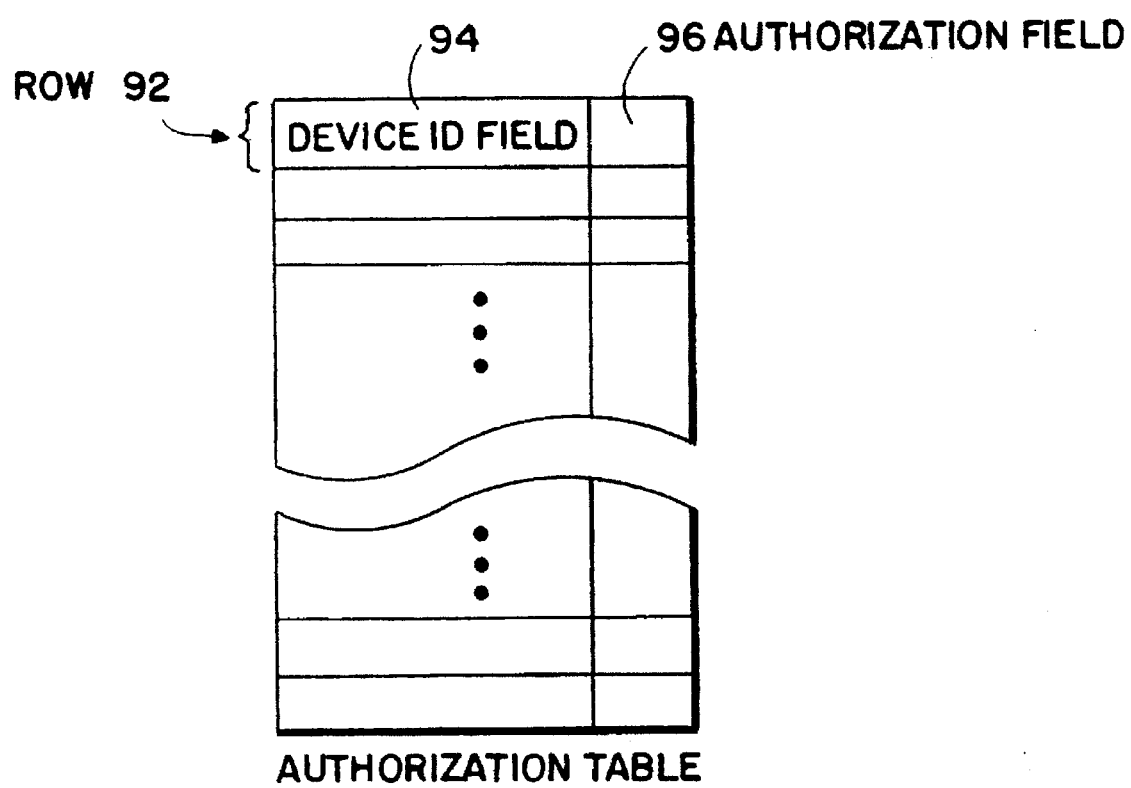
FIG. 3 is a diagram of an authorization table which is stored in the computer of FIG. 1.

FIG. 3 shows one technique for maintaining and verifying the authorization status for each Futurebus+ input/output device 30, 32, and 34. In FIG. 3, an authorization table 90 contains one row 92 for each Futurebus+ input/output device 30, 32, and 34 which may issue a command request. Each authorization table row 92 contains two fields, a device identification field 94 and an authorization field 96. In the embodiment shown, one authorization field 96 is show, which represents whether the identified Futurebus+ input/output device 30, 32, or 34 is authorized to halt the computer 10. In embodiments which process multiple types of commands, one authorization field 96 may be included for each command type. Thus, each Futurebus+ input/output device 30, 32, or 34 may be authorized to cause the execution of certain commands, but not other commands.

During initialization of the computer system 2, described below, the device identification field 94 of each Futurebus+ input/output device is filled with the same identification information as is written to the device identifier 72 of the command vector register 70 for the corresponding Futurebus+ input/output device. The authorization field 96 is filled with a code specifying whether the corresponding Futurebus+ input/output device is authorized to halt the computer system 2. The authorization field 96 may be written once during the initialization of the computer system 2, or may be updated dynamically during operation of the computer system 2. In FIG. 2, the subset of devices which are authorized is specified by the central processing unit 14. However, other embodiments could allow Futurebus+ input/output devices 30, 32, and 34 themselves, or other components of the computer system 2, to modify the authorization fields 96.

Generally, a subset of the total number of Futurebus+ input/output devices 30, 32, and 34 will be authorized to cause the execution of the particular command types. Thus, all, some, or none of the Futurebus+ input/output devices 30, 32, and 34 will be so authorized at any given time, and this authorization status will be reflected in the authorization field 96 corresponding to the particular command type.

An alternative embodiment of the authorization table 90 may have rows corresponding only to those Futurebus+ input/output devices which are authorized to halt the computer system, and have only a device identification field. This, or any other embodiment of an authorization table or technique, is within the scope of the invention if it allows for the storage and retrieval of the authorization status of the Futurebus+ input/output devices.

Referring to FIGS. 1 and 2, the operation of the disclosed invention begins with an initialization phase of the computer system 2. During this initialization phase, the central processing unit 14 of the computer 10 performs a write operation into the command vector register 70 and into the command address register 80 for each of the Futurebus+ input/output devices 30, 32, and 34. The device identifier 72 field of the command vector register 70 is filled with a code which is unique to each Futurebus+ input/output device. This insures that no two Futurebus+ input/output devices 30, 32, or 34 will have the same device identifier 72. In addition, the device identifier 72 may be used in a variety of ways beyond simply identifying which Futurebus+ input/output device 30 issued the halt command. For example, the device identifier 72 may also serve as an offset useful for calculating a jump into software routines executed by the central processing unit 14.

During the initialization phase, the central processing unit 14 also fills the command address register 80 of each Futurebus+ input/output device 30, 32, and 34 with an address. This address represents the location of the input end of the command request queue 42 in the address space of the input/output module 16. Thus, data written to the computer 10 at this address will be placed in the command request queue 42, provided that the command request queue 42 is not full. In contrast to the device identifier 72 field of the command vector register 70, the command address registers 80 of each Futurebus+ input/output device 30, 32, and 34 contain the same address.

During operation of the computer system 2, one or more of the Futurebus+ input/output devices 30, 32, and 43 may attempt to cause the execution of a command. To issue a command request, a Futurebus+ input/output device 30 performs a data write operation to the input/output module 16 via the Futurebus+ bus 20. The data which is written is composed of the device identifier 72 of the Futurebus+ input/output device 30 and a command code specifying the particular command that is requested. This command code may be pre-stored in the data value 74 field of the command vector register 70. The data, consisting of the device identifier 72 and the command code, is written to the address stored in the command address register 80 of the Futurebus+ input/output device 30. As previously described, this address represents the input location, or the tail, of the command request queue 42 in the address space of the input/output module 16.

If a Futurebus+ input/output device 30 issues a command request when the command request queue 42 is full, the input/output module 16 responds with a busy status signal because no additional data can be written into the command request queue 42. Upon receipt of the busy status signal, the Futurebus+ input/output device 30 may attempt to assert the command request again, or take other appropriate action.

If a Futurebus+ input/output device 30 issues a command request when the command request queue 42 is empty, the command request is written directly to the command request register 44. As shown in FIG. 2, the queue-empty output 46, which is cleared when a pending command request is in the command request register 44, causes the command bit 52 to be set in response to the command request by the Futurebus+ input/output device 30.

If the command enable bit 54 in the IOCSR 50 is set, enabling command requests, the setting of the command bit 52 in response to the command request generates a SYS__EVENT interrupt. This interrupt is asserted by the AND gate 62 via the SYS__EVENT line 60. In the embodiment of FIGS. 1 and 2, the SYS__EVENT interrupt is non-maskable. The SYS__EVENT interrupt is processed by an interrupt service routine. If the SYS__EVENT interrupt signal is used for multiple purposes, the interrupt service routine first determines the source of the SYS__EVENT interrupt. In the embodiment shown, status changes in the power supply of the computer system 2 and other conditions also generate SYS__EVENT interrupts. To insure that the receipt of a halt command was the source of the SYS__EVENT interrupt, the interrupt service routine can query the IOCSR 50 to verify that both the command enable bit 54 and the command bit 52 are set.

Having verified that the SYS__EVENT interrupt is due to a command request, the interrupt service routine reads the contents of the command request register 44. Because the command request register 44 represents the head of the command request queue 42, the read operation is destructive. In the embodiment of FIG. 2, where the command request queue 42 consists of only the command request register 44, this destructive read operation automatically leaves the command request queue 42 empty. The queue-empty output 46 is set, the command bit 52 of the IOCSR 50 is cleared, and the queue-full output 48 is cleared.

In the embodiment shown, when the que-empty output 46 is set, indicating that there are no command requests in the command request queue 42, subsequent reads of the command request register 44 return a data value of zero. This is particularly useful in multi-processor systems, where multiple central processing units are coupled to the computer bus 12, and where more than one central processing unit receives any SYS__EVENT interrupt that is generated. Upon generation of the SYS__EVENT interrupt, one of the central processing units will gain control of the computer bus 12. This central processing unit will read the command request register 44 and proceed as described below. Upon relinquishing control of the computer bus 12, this central processing unit may have emptied the command request queue 42. The remaining central processing units may, once they have gained control of the computer bus 12, attempt to read from the command request register 44 in response to the SYS__EVENT interrupt. While the command request queue 42 remains empty, however, the successive central processing units will read data values of zero from the command request register 44. This data value of zero indicates to the successive central processing units that there is no further command request, allowing the successive central processing units to return to normal operation. Alternatively, each central processing unit responding to a SYS__EVENT interrupt can query the IOCSR 50 to verify that the command bit 52 is set, indicating that the command request queue 42 is not empty, and that the command request register 44 does contain a command request to be processed.

After reading the command request register 44, the interrupt service routine determines the source of the command request. This is done by examining the portion of the command request register 44 which is a copy of the device identifier 72 of the requesting Futurebus+ input/output device 30. Because it is unique, the device identifier 72 portion of the command request register 44 data positively identifies which Futurebus+ input/output device 30 requested the command. The interrupt service routine may then determine whether that particular Futurebus+ input/output device 30 is authorized to cause the execution of the requested command. This is done by searching the device identification fields 94 of the authorization table 90 for the device identifier 72 of the requesting Futurebus+ input/output device 30. If the authorization field 96 in the same device row 92 which corresponds to the requested command type indicates that the corresponding device is authorized, then the interrupt service routine proceeds to execute, or to cause the execution of, the requested command. If the Futurebus+ input/output device 30 is not authorized to cause the execution of the requested command, the interrupt service routine ignores the command request and resumes the normal operation of the computer system 2. Optionally, a security warning may be generated to indicate that an input/output device 30, 32, or 34 has requested the execution of a command for which it is not authorized. Such security warnings may be reported to an operator, stored in a log file, or the like. Further command requests are handled in the same manner as described herein.

The interrupt service routine begins execution of the command by examining the data value 74 portion of the command request register 44 to determine what action has been requested. For instance, the data value 74 may indicate a request to halt the central processing unit 14, to reboot the computer 10, to place certain components of the computer system 2, such as the Futurebus+ input/output devices 30, 32, and 34, off-line, or to perform other operations.

Where the command request queue 42 has a depth of greater than one, and where more than one command request is simultaneously stored in the command request queue 42, the interrupt service routine may service those requests in one of a few ways. One method allows the interrupt service routine to service each request in sequence until the command request queue 42 is empty. It should be noted, however, that successive command requests may not be serviced if a previous request successfully causes the computer 10 to reboot or reset. An example of another method for servicing multiple pending command requests limits the interrupt service routine to servicing the first request in the command request queue 42. Control would then be returned, if allowed by the request, to the operating system and another SYS__EVENT interrupt would be generated for the next command request. This pattern would be repeated until the command request queue 42 is empty.

In the embodiment of FIGS. 1 and 2, the interrupt service routine is embedded in firmware within the computer system 2. However, the interrupt service routine may instead be hardwired in hardware, or be implemented in software and stored in the memory module 18 or other storage medium within the computer system 2. In addition, each Futurebus+ input/output device 30, 32, and 34 may contain multiple command vector registers 70. Multiple command vector registers 70 allows the interrupt service routine to distinguish not only among Futurebus+ input/output devices 30, 32, and 34, but also among procedures being executed on such a device. Thus, a Futurebus+ input/output device 30 can have multiple ports, with each port connected to a different external device 36, and with each of the external devices being individually authorized to cause the execution of various types of commands.

The embodiment of FIGS. 1 and 2 relate to the Futurebus+ environment for the purposes of illustration, but in no way limit the principles of the invention to a particular bus specification. While specific embodiments of the invention have been shown and described in detail to illustrate the application of the principles of the invention, it will be apparent that the invention may be embodied otherwise without deviating from the invention set forth in the following claims.

What is claimed is:

1. A process for screening commands issued over a bus for selective execution by a central processing unit comprising:

providing devices for issuing different types of commands;

associating a unique device identifier with each of the devices;

associating each unique device identifier with authorization status corresponding to each of the different types of commands, thereby designating each of the devices as being either authorized or not authorized to cause the execution of each of the different types of commands by the central processing unit;

issuing a command request from one of the devices over the bus to request execution of one of the different types of commands, the command request including the unique identifier associated with the requesting one of the devices and a command code specifying the one of the different types of commands;

checking the authorization status associated with the unique device identifier and corresponding to the one of the different types of commands specified by the command code in the command request; and submitting the one of the different types of commands to the central processing unit for execution if the requesting one of the devices is designated as authorized to cause execution by the central processing unit of the one of the different types of commands.

2. A computer system comprising:

a central processing unit;

a bus;

devices for issuing command requests over said bus for different types of commands to be executed by the central processing unit, each device having a device identifier associated therewith, each device providing in each of the command requests the associated device identifier and a command code specifying one of the different types of commands;

an authorization table for associating each device identifier with authorization fields each corresponding to a different one of the different types of commands, each authorization field indicating whether or not the device with which the device identifier is associated is authorized to cause the execution of the different one of the different types of commands to which the authorization field corresponds;

an input/output module coupled to the central processing unit, said input/output module receiving each of the command requests issued by said devices, the input/output module generating a signal upon receipt of each of the command requests to indicate that a command request has been received; and means, responsive to the generated signal, for processing command requests, said means for processing command requests examining the device identifier and the command code in each of the command requests, reading the authorization field associated with the device identifier and corresponding to the command code, and cabling the submission of the one of the different types of commands specified by the command code to said central processing unit for execution if the authorization field indicates that the device with which the device identifier is associated is authorized to cause the execution by said central processing unit of the command.

3. A computer system according to claim 2, wherein said bus is compliant with the IEEE Standard 896.

4. A computer system according to claim 2, wherein said signal generated by said input/output module is an interrupt signal.

5. A computer system according to claim 2, wherein said means for processing command requests is embodied in said central processing unit.

6. A computer system according to claim 2, wherein said means for processing command requests resides on the input/output module.

7. A computer system according to claim 2, wherein said authorization table resides in said means for processing command requests.

* * * * *